United States Patent [19]

Spanoudis

[11] 3,853,612
[45] Dec. 10, 1974

[54] METHOD FOR MAKING COATED RECEPTACLE FOR MICROWAVE COOKING OF FOOD

[75] Inventor: Louis Spanoudis, Toledo, Ohio

[73] Assignee: Owens-Illinois, Inc., Toledo, Ohio

[22] Filed: Sept. 10, 1973

[21] Appl. No.: 395,974

[52] U.S. Cl................ 117/212, 65/30, 65/60, 117/54, 117/123 A, 219/10.55, 219/10.61
[51] Int. Cl............................................. B44d 1/18
[58] Field of Search.......... 65/60, 30; 117/37 R, 42, 117/123 A, 124 T, 124 A, 124 F, 123 B, 47 A, 54, 106 R; 219/10.55, 10.61

[56] References Cited
UNITED STATES PATENTS

| | | | |
|---|---|---|---|
| 3,313,644 | 4/1967 | Morrissey | 117/37 R |
| 3,409,469 | 11/1968 | Kuntz | 117/106 R X |
| 3,420,693 | 1/1969 | Scholes | 117/106 R X |
| 3,561,940 | 2/1971 | Scholes | 65/60 |
| 3,716,687 | 2/1973 | Constable | 219/10.55 |
| 3,773,669 | 11/1973 | Yamauchi et al. | 219/10.55 X |

Primary Examiner—Robert L. Lindsay, Jr.
Attorney, Agent, or Firm—Howard G. Bruss, Jr.; E. J. Holler

[57] ABSTRACT

Disclosed is a method for selectively coating a glass-ceramic cooking receptacle with a semiconductive tin oxide coating by heating predetermined areas thereof and pyrolyzing tin oxide on said predetermined areas.

9 Claims, No Drawings

METHOD FOR MAKING COATED RECEPTACLE FOR MICROWAVE COOKING OF FOOD

This invention relates to a receptacle for containing food during microwave cooking thereof. More particularly, the present invention relates to a glass-ceramic receptacle having thereon a semiconductive tin oxide coating for browning or searing the food which is cooked with microwaves.

The cooking or heating of food with microwave energy is a well established art. The advantage of cooking food with microwave energy is that the foods cook quickly in the bulk form. When such food as meat loaf, roasts, steaks, chops, hamburgers, grilled sandwiches are prepared, a surface searing is considered important for achieving flavor and appearance. While microwave energy is efficient in the cooking of food, the cooked food does not always look "done" because it is not heated to the point where the surface thereof browns or sears to give an appetizing appearance. Accordingly, while the food is cooked, it does not appear appetizing to the consumer.

To overcome this disadvantage, prior art has proposed many methods of heating the external surface of the food to the point where browning or searing is visible. For instance, supplemental heating with infrared or electrical resistance heating has been proposed. This method is burdened with the additional requirement for heating apparatus and controls therefor.

Other proposals have dealt primarily with providing the receptacle in which the food is cooked with a coating which converts the microwave energy to sensible heat to brown or sear the food product being cooked.

One such technique is disclosed in German Auschlegteschrift No. 1,049,019 which proposes providing the microwave cooking dish with material whose loss factor is such that it is heated by the microwave field to a temperature sufficient for browning the food stuff in contact therewith. U.S. Pat. No. 2,830,162 proposes providing the microwave cooking dish with a material which has an energy absorption factor which is variable with temperature, so that after exceeding a given temperature, the conversion of microwave energy to thermal energy decreases so that burning of the food is avoided. This patent is particularly concerned with ferromagnetic-like ceramics and alloys having special Curie point characteristics More recently, semiconductive coatings of tin oxide have been proposed for coating glass-ceramic microwave cooking dishes to convert microwave energy to heat energy.

The present invention is an improvement in this latter type of microwave cooking dish in that it provides for the application of a semiconductive tin oxide coating to preselected areas of a glass-ceramic substrate for the purpose of providing a coating capable of converting microwave energy to sensible thermal energy only in those predetermined areas.

Glass-ceramic materials have been found to be very suitable materials for cooking substrates in microwave ovens. The thermal conductivity of glass-ceramics are generally low and absorption of microwave energy is relatively low. Accordingly, glass-ceramic function well as cooking surfaces in that they do not readily absorb microwave energy and do not readily conduct heat away from the food being cooked. As a direct result of these two properties, the foods are not sensibly heated on the surface while they are being cooked and do not "brown." It has been found that by coating the glass-ceramic receptacles with a semiconductive tin oxide, the surface absorbs sufficient microwave energy to heat the plate sufficiently so that food will be sufficiently heated to cause browning thereof before and during microwave cooking.

The term "glass-ceramic" is used herein according to its conventional meaning and refers to a semicrystalline ceramic body which is composed of at least one crystalline phase randomly dispersed in a residual glassy phase or matrix. Such crystalline phase is formed by the in situ thermal crystallization of a parent glass composition. The compositions and methods for forming the glass-ceramic receptacle are known in the art and form no part of the present invention. Suffice it to say that in many instances, the glass-ceramic receptacles used in practicing the present invention are in the lithium aluminosilicate, magnesium aluminosilicate, or lithium magnesium aluminosilicate composition fields and have a coefficient of thermal expansion of less than about $3 \times 10^{-6}/°C$ (0°–300°C). Preferably for efficiency and economy, the coefficient of thermal expansion is less than about $1 \times 10^{-6}/°C$ (0°–300°C) to reduce stresses from thermal shock. Additional details on glass-ceramics are available in U.S. Pat. Nos. 3,117,881; 3,493,355; 2,920,971; 3,205,079 and the article entitled, *Chemical Compositions of Glass-Ceramics*, by M. Tashino appearing in the July and August 1966 issues of *The Glass Industry*, the the disclosures of which are incorporated by reference.

In practicing the present invention, it is not desirable to coat the complete surface of the glass-ceramic receptacle with the semiconductive tin oxide coating because the entire receptacle will heat up rather than just the intended cooking area. This results in less efficient use of the microwave energy as well as being quite inconvenient because the entire receptacle is hot and difficult to handle when removing the cooked food from the microwave oven. The term "microwave" is used herein in its conventional sense which usually includes electromagnetic energy in the frequency of 1,000 to 30,000 MHz.

Accordingly, the present invention provides for selectively heating the plate prior to application of the tin oxide. The heating is confined to the desired area because of the low thermal conductivity of the glass-ceramic receptacle and selective heating is achieved.

In attaining the objectives of this invention one feature resides in pyrolyzing a semiconductive tin oxide coating on a glass-ceramic receptacle by selectively applying heat to predetermined portions of the glass-ceramic receptacle to raise the temperature of the predetermined portions above the pyrolysis temperature of the tin compound being employed while maintaining the temperature of other portions of the receptacle below the pyrolysis temperature of the tin compound, and then contacting the heated glass-ceramic receptacle with the tin compound for a time sufficient to pyrolyze a semi-conductive tin oxide on the predetermined portions.

The low thermal conductivity of glass-ceramic materials makes this "zone heating" technique possible because the applied heat is not evenly distributed through the glass-ceramic receptacle and, thus, there are "hot spots" on the glass-ceramic receptacle corresponding to those areas of intense heat application. This property together with the low thermal expansion characteristics of the glass-ceramic body which permits its use in the rapid heat application prevents cracking of the body due to thermal shock.

In practicing the present invention, the glass-ceramic receptacle can be in any form such as a dish, plate, bowl, or pot. The heat can be applied by means of an electrical resistance or induction heater or by direct flame although heat shielding may be necessary to confine the heat to the desired area of the glass-ceramic receptacle.

The tin compound used to deposit the tin oxide coating is not particularly critical as long as the tin oxide compound is pyrolyzable at the temperature employed. The tin compounds that can be used for the purpose of the present invention include both stannous and stannic compounds. Among the suitable stannic compounds are the stannic halides, the alkyl stannic carboxylates, and the tin tetraalkoxides. The stannic halide can be exemplified by stannic chloride, stannic bromide, and stannic iodide. The alkyl stannic carboxylates have the general formula

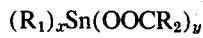

wherein $R_1$ and $R_2$ are alkyls, and wherein x and y are whole numbers from 1 to 3, the sum of which is equal to four. The alkyls may be branched or straight chain. $R_2$ preferably contains from 1 to 18 carbon atoms and may be methyl, propyl, butyl, isopropyl, isobutyl, hexyl, octyl or the like. Included among the many compounds coming within the scope of the foregoing are dibutyl tin diacetate, dipropyl tin diacetate, dioctyl tin diacetate, dibutyl tin distearate, dibutyl tin dipalmitate dibutyl tin dilaurate, dibutyl tin maleate and the like. Alkyl tin halides such as dimethyl tin dichloride are also effective.

Among the stannous tin compounds suitable for the purposes of this invention are stannous dihalides, such as stannous chloride, stannous bromide, stannous iodide and the carboxylic acid salts of stannous tin. The latter include compounds having the formula

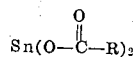

wherein R is an aliphatic or aromatic group. Included among the aliphatic groups are the alkyls, both substituted and unsubstituted having up to 18 carbon atoms. The aromatic groups include the cyclic carboxylic acids wherein the aryl is benzyl, phenyl, naphthyl, or the like. Among the carboxylic acid salts suitable for the purpose of this invention are stannous oleate, stannous palmitate, stannous stearate, stannous caproate, stannous laurate, stannous naphthenate, stannous tartrate, stannous gluconate, stannous acetate, and the like. It is to be understood that any tin compound can be used in forming the semiconductive tin oxide ocating, provided that such compound is capable of pyrolyzing to tin oxide on the glass-ceramic receptacle.

The tin compound can be applied by a variety of techniques such as by direct spray of a solution of a tin compound or by the application of tin chloride vapors obtained by bubbling an inert gas or air through tin chloride liquid.

The most commercially expedient coating technique uses anhydrous tin tetrachloride vapor ($SnCl_4$). The vapor pressure of $SnCl_4$ at room temperature is 23.7 mm of Hg which permits appreciable amounts to be transported in a moving air flow. When dry air is bubbled through $SnCl_4$, the air removes the vapor in the flask at a rate dependent on the air flow. This allows for convenient control of the deposition rate of the tin oxide coating. For example, an air sparge of 30 standard cubic feet per hour through $SnCl_4$ in a 2 liter flask at room temperature will remove 4.8 gm of $SnCl_4$ in 1 minute. This is sufficient material to deposit a semiconductive layer of 500 A to 7,000 A thick of tin oxide on a glass-ceramic receptacle at 550 °C. The actual amount of reacted $SnCl_4$ responsible for the film is probably less than 0.5 percent of the 4.8 gm passed over the surface. This low efficiency is characteristic of coating processes using $SnCl_4$ vapor and is largely due to the small amount of water vapor at the surface.

A second material used in the vapor phase coating technique is dimethyl tin dichloride $(CH_3)_2SnCl_2$. This compound requires a hot air system to avoid condensations and to obtain sufficient amounts of vapor. When liquid spray application is desired, a composition comprising (by volume) 32% $SnCl_4$, 2% dilute HF (48%), 58 percent isopropyl alcohol, and 8 percent water can be used. Coating deposited on heated glass-ceramics using this solution are similar to the $SnCl_4$ vapor coating.

Another tin compound suitable for spray application is tin tetratertiary-amyloxide, $Sn(OC_5H_{11})_4$, in 50 percent by solution in tertiary amyl alcohol. This tin compound pyrolyzes above 200 °C to give primarily tin oxide and alcohol. For economy and efficiency, the glass-ceramic receptacle is heated in the range of 200 °C to about 700 °C and preferably in the range of about 300 °C to about 600 °C for effective pyrolysis of the tin compounds.

The resulting semiconductive tin oxide coatings have a surface resistivity of about 50 to about 1,000 ohms per square with about 50 to about 500 ohms per square being preferred for efficiency and economy. The thickness of the coating is estimated to vary from about 500 angstroms to about 10,000 angstrom with about 1,000 angstrom to about 7,000 angstroms being typical. The time required varies from a few seconds to several minutes depending on the temperature and method of the application.

In use, the coated receptacle is merely placed in the microwave oven for a short time to bring the receptacle surface up to the desired temperature which is usually in the neighborhood of 200 °C to 300 °C. The food is then placed on the heated receptacle and cooked in the microwave oven for the desired cooking time.

In the Examples that follow, all parts are parts by weight, all percentages, weight percentages, and all temperatures are in °C unless otherwise stated.

EXAMPLE 141

An electric resistance heating element like those commonly used in cooking range is used as the heating source. The element is oval in shape with a major axis of about 10.5 inches and a minor axis of 7.8 inches. The heating element is a 1,200 watt unit and is operated at 85 percent of full voltage which is 208 volts. Under these conditions, the element draws between 6 and 7 amps. With the heating element energized and having reached temperature at "red heat," a conventional glass-ceramic dish having a coefficient of thermal expansion of less than about $1 \times 10^{-6}/°C$ (0–300 °C), the composition in weight % $SiO_2$-70%, $Al_2O_3$-20%, $Li_2O$-41, $ZiO_2$-1.5%, $TiO_2$-1.5%, $ZnO$-2%, $Na_2O$-0.5%, $K_2O$-0.2%, $F_2$-0.3%, is placed over the heating element with food contacting surface toward element at a distance of about one/half inch. The glass-ceramic dish dimension is 12.8 inches × 9.8 inches and 0.105 inch to 0.110 inch thick and is approximately "centered" over the heating element. An aluminum reflector in the shape of a pan is placed over the heating element above the glass-ceramic dish to serve as a heat shield to confine the heat in the vicinity of the heating element so that the entire glass-ceramic dish is not heated.

After 3 to 4 minutes of heating under these conditions, the surface temperature of the glass-ceramic dish, in area confronting the heating element, varies from about 500°–600°C as measured by a thermocouple in contact with the dish. The dish is then contacted on the side opposite that for food contact with tin chloride vapors. These vapors are generated by bubbling air in through liquid stannic chloride.

Several dishes are coated in this manner and treatment time varies between 15 seconds and 2 minutes. The resulting dishes have a semiconductive coating of tin oxide thereon with a surface resistivity in the range of about 50 to about 300 ohms per square. The thickness of the tin oxide coating is estimated to be about 2,000 to 3,000 angstroms. The tin oxide coating took the shape corresponding to the heating areas from the heating element. Several of the dishes coated by the above procedures are evaluated and characterized and the results are reported in Table I.

The tin oxide coated dishes are then placed in a conventional microwave oven operating at 2,450 MHz to determine the length of time required to heat up to 200°C and 260°C as these temperatures provide effective searing for most foods. It is noted that the coated dish heated only in the coated area and is cool to the touch in the uncoated areas.

Table I

| Example | Area Coated (cm₂) | Dish Thickness (cm) | Average Surface Resistivity of the tin oxide coated surface ohms/sq. | Time (Minutes) Needed to Reach | |
|---|---|---|---|---|---|
| | | | | 200°C | 260°C |
| 1-A | 277 | 0.279 | 252 | 2.8 | 3.9 |
| 1-B | 342 | 0.272 | 299 | 3.7 | 5.0 |
| 1-C | 510 | 0.272 | 216 | 4.6 | 6.2 |
| 1-D | 430 | 0.254 | 152 | 3.3 | 4.7 |

The above coated dishes are then used in the cooking of various foods and the results are reported below in Table II. In these tests, the food is placed on the side of the dish opposite from the tin oxide coating so there is no direct contact between the food and the tin oxide coating.

Table II

| Example | 1-A | | 1-B | | 1-C | | 1-D | |
|---|---|---|---|---|---|---|---|---|
| Food | Delmonico steak | Bread (2 slices) | Sirloin steak | Pork chops | Delmonico steak | Pancakes | Rib steak | Pancakes |
| Preheat Time(Minutes) | 4 | 3 | 5 | 5 | 5 | 5 | 5 | 5 |
| Results | Good Browning | Medium toast with dark spots | Good browning | Medium browning | Medium browning | Medium browning with dark spots | Medium browning | Good browning with dark spots |

In conducting the forgoing food cooking tests, it is noted that the glass-ceramic receptacle does not heat up in areas which do not have a tin oxide coating thereon. The dishes are easily handled and are cool to the touch in the uncoated areas upon removal from the oven.

Having thus described the invention, what is claimed is:

1. In the process for depositing a semiconductive tin oxide coating on a glass-ceramic receptacle for microwave cooking where a pyrolyzable tin compound is contacted with said glass-ceramic receptacle at a temperature sufficient to pyrolyze semiconductive tin oxide thereon, the improvement comprising selectively applying heat to predetermined portions of said glass-ceramic receptacle to raise the temperature of said predetermined portions have the pyrolysis temperature of said tin compound while maintaining the temperature of other portions of said receptacle below the pyrolysis temperature of said tin compound and then contacting the resulting heated glass-ceramic receptacle with said tin compound for a time sufficient to pyrolyze a semiconductive tin oxide coating on said predetermined portions.

2. The process of claim 1 wherein said predetermined portions are heated to a temperature in the range of about 200°C to about 700°C.

3. The process of claim 1 wherein said predetermined portions are heated to a temperature in the range of about 300°C to about 600°C.

4. The process of claim 1 wherein said glass-ceramic receptacle has a coefficient of thermal expansion of less than about $3 \times 10^{-6}$/°C (0–300°C).

5. The process of claim 1 wherein said glass-ceramic receptacle has a coefficient of thermal expansion of less than about $1 \times 10^{-6}$/°C (0–300°C).

6. The process of claim 1 wherein said semiconductive tin oxide coating has a surface resistivity in the range of about 50 to about 1,000 ohms per square.

7. The process of claim 1 wherein said semiconductive tin oxide coating has a thickness of about 500 to about 10,000 angstroms.

8. The process of claim 1 wherein said semiconductive tin oxide coating has a surface resistivity in the range of about 50 to about 500 ohms per square.

9. The process of claim 1 wherein said semiconductive tin oxide coating has a thickness of about 1,000 to about 7,000 angstroms.

* * * * *